US 8,606,577 B1

United States Patent
Stewart et al.

(10) Patent No.: US 8,606,577 B1
(45) Date of Patent: Dec. 10, 2013

(54) VISUAL CONFIRMATION OF VOICE RECOGNIZED TEXT INPUT

(71) Applicant: Google Inc., Mountain View, CA (US)

(72) Inventors: Andrew Stewart, London (GB); Peter Ng, Mountain View, CA (US); Alexander Faaborg, Mountain View, CA (US); Matias Gonzalo Duarte, Mountain View, CA (US); Daniel Marc Gatan Shiplacoff, Los Altos, CA (US); Bjorn Erik Bringert, London (GB); Richard Zarek Cohen, London (GB); Luca Zanolin, London (GB); Pawel Pietryka, London (GB); Peter John Hodgson, London (GB); Simon Tickner, London (GB); Henrique Penha, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/733,715

(22) Filed: Jan. 3, 2013

Related U.S. Application Data

(60) Provisional application No. 61/664,142, filed on Jun. 25, 2012.

(51) Int. Cl.
*G10L 15/00* (2013.01)

(52) U.S. Cl.
USPC .......................................... 704/235; 704/231

(58) Field of Classification Search
USPC .................................................. 704/231, 235
See application file for complete search history.

(56) References Cited

U.S. PATENT DOCUMENTS

| 8,352,261 | B2 * | 1/2013 | Terrell et al. | 704/235 |
|---|---|---|---|---|
| 2008/0243500 | A1 * | 10/2008 | Bisani et al. | 704/235 |
| 2009/0228274 | A1 * | 9/2009 | Terrell et al. | 704/235 |
| 2010/0056128 | A1 * | 3/2010 | Hwang et al. | 455/418 |
| 2010/0204989 | A1 * | 8/2010 | Boes et al. | 704/235 |
| 2011/0060587 | A1 * | 3/2011 | Phillips et al. | 704/235 |
| 2012/0296646 | A1 * | 11/2012 | Varthakavi et al. | 704/235 |

\* cited by examiner

*Primary Examiner* — Douglas Godbold
(74) *Attorney, Agent, or Firm* — Shumaker & Sieffert, P.A.

(57) ABSTRACT

A computing device receives an audio input from a user. The computing device determines a series of words from the audio input. The computing device outputs, for display, one or more substituted symbols. The one or more substituted symbols correspond to at least a portion of the series of words. In response to determining that receipt of the audio input has completed, the computing device outputs, for display, alphanumeric characters comprising the series of words in place of the one or more substituted symbols.

20 Claims, 8 Drawing Sheets

VISUAL CONFIRMATION OF VOICE RECOGNIZED TEXT INPUT

This application claims the benefit of U.S. Provisional Application No. 61/664,142, filed Jun. 25, 2012, the entire content of which is hereby incorporated by reference.

BACKGROUND

Some computing devices (e.g., mobile phones) are configured with speech-to-text functionality for converting spoken language into written form. For example, a computing device can be configured with speech-to-text functionality that can receive audio input (e.g. a user's voice) and determine text content (e.g., SMS message or email) based on the audio input.

Typically, a computing device receives audio input from words spoken into a microphone of the computing device. While a user is speaking, the computing device can identify spoken words in the audio input. The computing device can then output the identified words for display (e.g., on a screen of the computing device). Current technology may allow a computing device to perform speech-to-text conversion in near real-time and provide near-instant feedback to the user.

However, users may be distracted by seeing a near real-time text conversion of the spoken text displayed on a screen before they have finished speaking—particularly when the computing device has made transcription errors. For instance, if the computing device does not properly recognize and displays an incorrect word, the user may pause speaking in the middle of a sentence in an attempt to backtrack and/or otherwise correct the error. Such speech pauses may cause more transcription errors as the computing device may rely on natural speech patterns to perform the speech-to-text conversion and on word context to automatically perform transcription error correction.

SUMMARY

In one example, the disclosure is directed to a method. The method may in include receiving, by a computing device, an audio input. The method may further include determining, by the computing device, a series of words based on the audio input. In addition, the method may include outputting for display, by the computing device, one or more substituted symbols, wherein the one or more substituted symbols correspond to at least a portion of the series of words. In response to determining that receipt of the audio input has completed, the method may further include outputting for display, by the computing device, alphanumeric characters comprising the series of words in place of the one or more substituted symbols.

In another example, the disclosure is directed to a computer-readable storage medium. The computer-readable storage medium may include instructions that, when executed by at least one processor of a computing device to receive an audio input. The instructions when executed may further cause the at least one processor of the computing device to determine a series of words based on the audio input. The instructions when executed may further cause the at least one processor of the computing device to output for display, one or more substituted symbols. The one or more substituted symbols may correspond to at least a portion of the series of words. The operations may further include determining that the audio input has ended. In response to determining that receipt of the audio input has completed, the instructions when executed may further cause the at least one processor of the computing device to output for display, alphanumeric characters comprising the series of words in place of the one or more substituted symbols.

In another example, the disclosure is directed to a computing device. The computing device may include one or more processors being configured to receive an audio input. The one or more processors being further configured to determine a series of words based on the audio input. The one or more processors being further configured to output for display, one or more substituted symbols. The one or more substituted symbols may correspond to at least a portion of the series of words. In response to determining that receipt of the audio input has ended, the one or more processors being further configured to output for display alphanumeric characters comprising the series of words in place of the one or more substituted symbols.

The details of one or more examples are set forth in the accompanying drawings and the description below. Other features, objects, and advantages of the disclosure will be apparent from the description and drawings, and from the claims.

DETAILED DESCRIPTION

Figure 1:
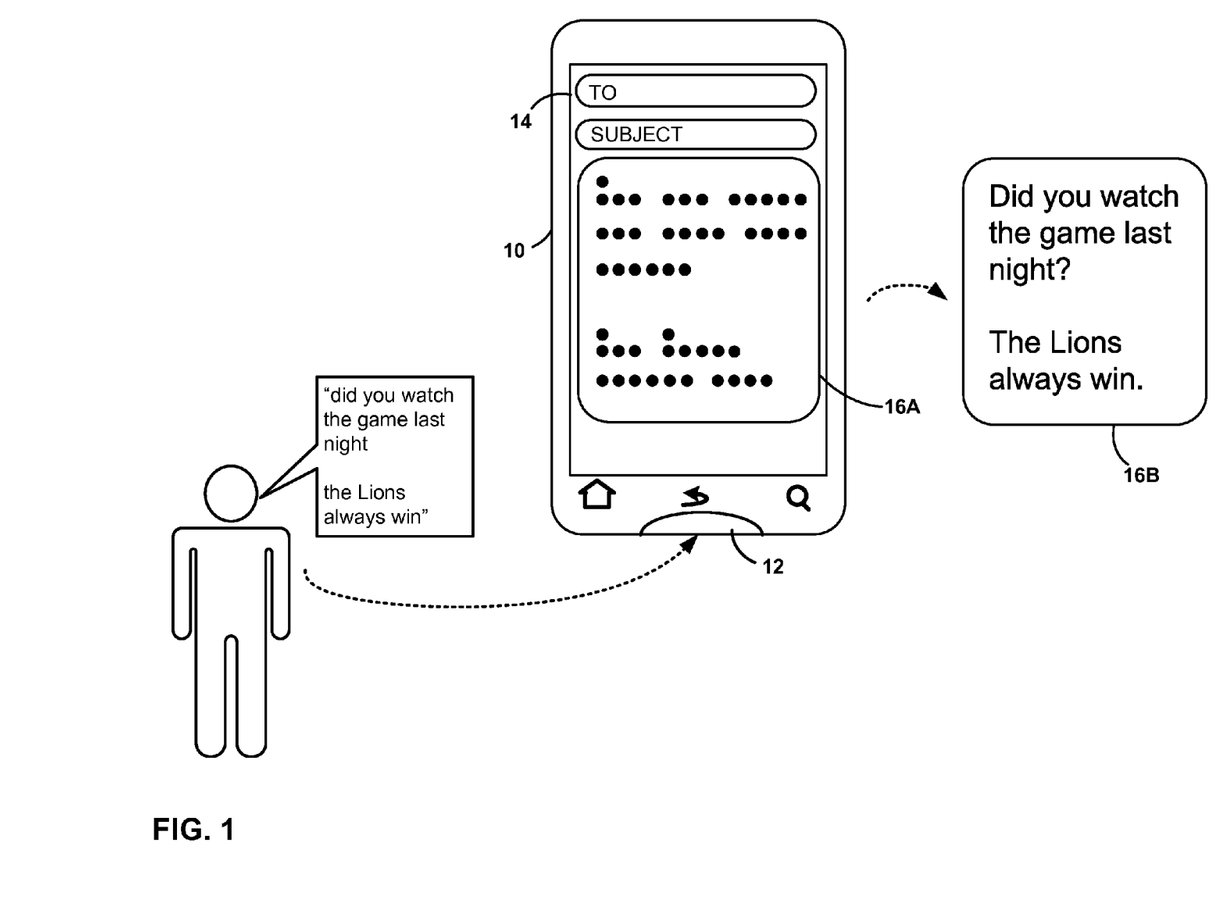
FIG. 1 is a conceptual diagram illustrating an example computing device.

FIG. 1 is a conceptual diagram illustrating an example computing device 10. In the example of FIG. 1, computing device 10 is a smartphone. However, in other examples, computing device 10 may be a cellular phone, a personal digital assistant (PDA), a laptop computer, a tablet computer, a portable gaming device, a portable media player, an e-book reader, a watch, or another type of portable or mobile computing device. Furthermore, in other examples, computing device 10 may be a non-portable computing device such as desktop computer, a landline telephone, or a television.

In the example of FIG. 1, computing device 10 outputs user interfaces 16A and 16B (collectively, "user interfaces 16") for display at screen 14. Computing device 10 also includes a microphone 12 for receiving an audio input (e.g., speech from a user).

Screen 14 of computing device 10 includes a presence-sensitive display. Screen 14 may include a touchscreen configured to receive tactile user input from the user or other users of computing device 10. Screen 14 may include any one or more of a liquid crystal display (LCD), dot matrix display, light emitting diode (LED) display, organic light-emitting diode (OLED) display, e-ink, or similar monochrome or color display capable of providing visible information to the user of computing device 10 and for receiving tactile input from the user. Screen 14 may present a user interface (e.g., user interface 16) that relates to functionality provided by computing device 10. For example, screen 14 may present various functions and applications including, e.g. an e-mail client, text messaging client, and address book stored on computing device 10. In another example, screen 14 may present a menu of options related to the function and operation of computing device 10, such as screen brightness and other configurable mobile phone settings.

User interfaces 16 may include graphical elements presented at locations of screen 14 for receiving tactile input from or providing graphical output to the user. For example, user interfaces 16 may include a string of characters presented at screen 14 as a graphical output to the user. The string of characters may form the body of an e-mail or SMS text message written by the user. By including the message body within user interfaces 16, prior to sending the message by computing device 10, the computing device may provide a visual confirmation (e.g., feedback) to a user that the message does not include textual errors.

Microphone 12 may receive audio input (e.g., speech from a user). In FIG. 1, microphone 12 is arranged below screen 14 of computing device 10. In other examples, however, microphone 12 may be arranged at another suitable location of computing device 10 for receiving audible input.

Computing device 10 may utilize a speech-to-text system. For example, computing device 10 may be configured to receive audio input from a user and output words represented by the audio input as text (e.g., for display at screen 14). In this way, a user may dictate, rather than type, a message with computing device 10. For example, FIG. 1 shows computing device 10 receiving an audio input spoken into microphone 12 of computing device 10 by a user that includes the spoken words, "did you watch the game last night the lions always win". A typical speech-to-text system may transcribe the audio input that includes these spoken words into a series of words represented by a string of alphanumeric characters. However, in accordance with the techniques of this disclosure, rather than outputting the string of alphanumeric characters to user interface 16A, computing device 10 may output one or more substituted symbols to user interface 16A in place of the string of alphanumeric characters. The substituted symbols may resemble the string of alphanumeric characters based on number, size, and orientation. Each substituted symbol from the one or more substituted symbols may correspond to a different alphanumeric character in the series of words.

The substituted symbols may provide an indication that speech transcription of an audio input has occurred or is occurring without revealing any potential transcription errors. Outputting substituted symbols may minimize speech pauses in an audio input received from a user and may help to ensure that a user speaks naturally when the audio input is being received. By helping to ensure that a user speaks naturally audio capture, the speech-to-text system may perform more efficient transcriptions and therefore may consume less processing resources.

Upon determining that receipt of the audio input has completed, computing device 10 may replace the substituted symbols of user interface 16A with alphanumeric characters representing the series of words (depicted in FIG. 1 as user interface 16B).

As depicted in FIG. 1, and in accordance with the techniques of this disclosure, computing device 10 may receive an audio input and determine a series of words based at least in part on the audio input. Computing device 10 may output for display one or more substituted symbols (e.g., at a screen 14). The substituted symbols may correspond to at least a portion of the series of words. For example, each of the substituted symbols may correspond to a different alphanumeric character in the series of words.

In another example, in addition to determining a series of words based at least in part on the audio input, computing device 10 may determine a waveform based at least in part on the audio input. The waveform may include a shape. Each word from the series of words may correspond to a portion of the waveform. The shape of each portion of the waveform may correspond to each word from the series of words and the shape may be visible from the substituted symbols being outputted for display. For example, the waveform may represent an audio parameter (e.g. volume, tone, pitch, etc.) of the audio input as a value associated with the parameter changes over time. The substituted symbols may depict the shape of the waveform when presented at screen 14. More particularly, the substituted symbols may depict the shape of each portion of the waveform that corresponds to each word when presented at screen 14. Outputting substituted symbols at screen 14 may render the series of words not readable. In response to determining that receipt of the audio input has completed, computing device 10 may output for display (e.g., at screen 14), alphanumeric characters including the series of words in place of the one or more substituted symbols.

Figure 2:
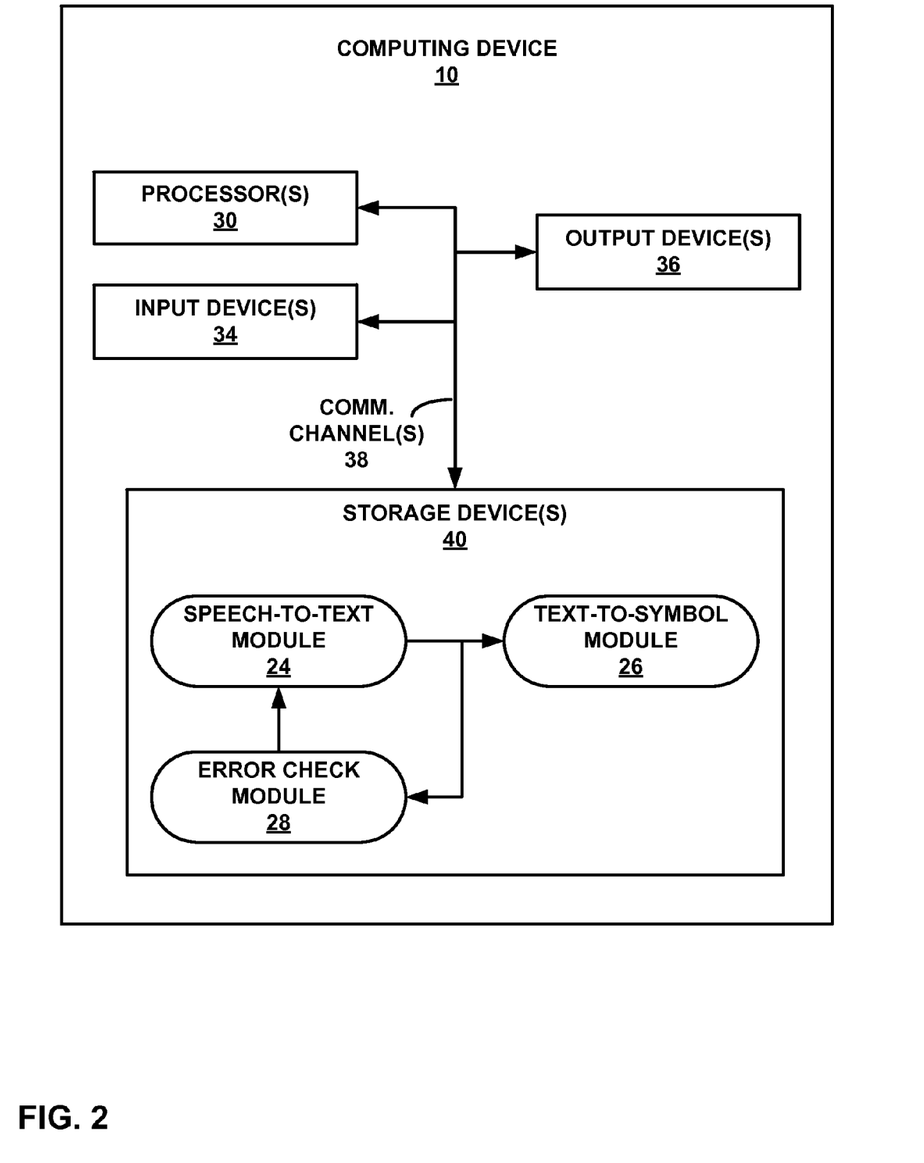
FIG. 2 is a block diagram illustrating an example configuration of the computing device.

FIG. 2 is a block diagram illustrating an example configuration of computing device 10. FIG. 2 illustrates only one particular example of computing device 10, and many other example configurations of computing device 10 may be possible. As shown in the specific example of FIG. 2, computing device 10 includes one or more processors 30, one or more input devices 34, one or more output devices 36, and one or more storage devices 40. In this example, storage device 40 of computing device 10 also includes a speech-to-text module 24, a text-to-symbol module 36, and an error check module 28. Communication channels 38 may interconnect each of the components 30, 34, 36, 40, 24, 26, and 28 for inter-component communications (physically, communicatively, and/or operatively). In some examples, communication channels 38 may include a system bus, a network connection, an inter-process communication data structure, or any other method for communicating data.

One or more processors 30 may implement functionality and/or execute instructions within computing device 10. For example, processors 30 may process instructions stored in storage device 40 that execute the functionality of speech-to-text module 24.

One or more storage devices 40 within computing device 10 may store information required for use during operation of computing device 10. Storage device 40, in some examples, has the primary purpose of being a short term and not a long term computer-readable storage medium. Storage device 40 on computing device 10 may be a volatile memory and therefore not retain stored contents if powered off. Examples of volatile memories include random access memories (RAM), dynamic random access memories (DRAM), static random access memories (SRAM), and other forms of volatile memories known in the art. Storage device 40 may further be configured for long-term storage of information as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processors 30 on computing device 10 read and execute instructions stored by storage device 40. In addition, speech-to-text module 24, text-to-symbol module 36, and error check module 28 running on computing device 10 may store information within storage device 40 during program execution.

Computing device 10 may contain one or more input devices 34 that computing device 10 uses to receive input from a user, via tactile, audio, or video feedback. Input devices 34 of computing device 10, in one example, includes a presence-sensitive screen, a touch-sensitive screen, a mouse, a keyboard, a voice responsive system, video camera, microphone or any other type of device for detecting a command from a human or machine. Input devices 34 may include screen 14 and microphone 12 of FIG. 1.

Computing device 10 may contain one or more output devices 36 that computing device 10 uses to provide output via tactile, audio, or video stimuli. Output device 36 of computing device 10, in one example, includes a presence-sensitive screen, a sound card, a video graphics adapter card, or any other type of device for converting a signal into an appropriate form understandable by human or machine. Additional examples of output device 36 include a speaker, a cathode ray tube (CRT) monitor, a liquid crystal display (LCD), or any other type of device that can generate intelligible output to a user and/or a machine. Output devices 36 may include screen 14 of FIG. 1.

Storage device 40 may store program instructions and/or data associated with speech-to-text module 24, text-to-symbol module 36, and error check module 28. For example, text-to-symbol module 36 may include instructions that cause processors 30 of computing device 10 to perform one or more of the operations and actions described in the present disclosure.

In accordance with the techniques of this disclosure, computing device 10 may receive an audio input at input device 34 (e.g. computing device 10 may receive the audio input at microphone 12 of FIG. 1). The audio input may represent a dictation of an e-mail, a SMS text message, an instant message, or portions of electronic words that make up a body of a document. Upon receiving an indication of the audio input, input device 34 may transmit data associated with the audio input, to speech-to-text module 24 of computing device 10 over internal communication channel 38.

Upon receiving the data associated with the audio input, speech-to-text module 24 may perform speech transcription functions and determine a series of words based on the audio input. The series of words may include one or more alphanumeric characters. For example, speech-to-text module 24 may perform statistical based speech-to-text transcription with a Hidden Markov Model (HMM), Dynamic Time Warping (DTW), neural networks, or any other known speech-to-text transcription model known in the art where the model outputs text based on audible speech. After transcribing the audio input into a series of words, speech-to-text module 24 may output the one or more alphanumeric characters that comprise the series of words to text-to-symbol module 26.

While computing device 10 may utilize local processors 30 to determine a series of words based on the audio input, as described above, another example of the present disclosure may utilize a remote computing device to perform these speech-to-text transcription functions. For example, computing device 10 may transmit the audio input to a remote computing device (not depicted) and receive from the remote computing device, the series of words (and corresponding alphanumeric characters) based on the audio input. Examples of the remote computing device may include a personal computer, a laptop computer, a handheld computer, a workstation, a data storage system, a supercomputer, a mainframe computer, a conventional web server, a specialized media server, or other types of computing devices including but not limited to examples of computing device 10 stated above. In other words, speech-to-text module 24 may execute remotely on a remote computing device, receive data associated with an audio input from computing device 10 and transcribe audio input on behalf of computing device 10.

Upon receiving the one or more alphanumeric characters associated with the series of words from speech-to-text module 24, text-to-symbol module 26 may determine one or more substituted symbols that correspond to at least a portion of the series of words. Text-to-symbol module 26 may transmit the one or more substituted symbols to output device 36. Output device 36 output for display the one or more substituted symbols. For instance, output device 36 may output for display the one or more substituted symbols as part of user interface 16A at screen 14 of FIG. 1.

Speech-to-text module 24 may determine that receipt of the audio input has completed and notify text-to-symbol module 26 that receipt of the audio input has completed. In response to receiving the notification that receipt of the audio input has completed, text-to-symbol module 26 may transmit the one or more alphanumeric characters originally received from speech-to-text module 24, to output device 36. Upon receiving the one or more alphanumeric characters, output device 36 may output for display the one or more alphanumeric characters in place of the substituted symbols. For instance, output device 36 may output for display the one or more alphanumeric characters as part of user interface 16B presented at screen 14 of FIG. 1.

Computing device 10 may output for display the one or more substituted symbols during receipt of the audio input. For instance, input device 34 may utilize a buffer for capturing and temporarily storing data associated with the audio input while computing device 10 processes the audio input. By utilizing a buffer in this way, speech-to-text module 24, text-to-symbol module 26, and output device 36 may perform the operations described above to transcribe and display the substituted symbols in near-real-time after first receiving a start of the audio input. The buffer may allow computing device 10 to processes a portion of the audio input before determining that receipt of the audio input has completed. In other words, computing device 10 may transcribe portions of an audio input after input device 34 receives the portions without waiting for a user to finish speaking the audio input. Configuring computing device 10 in this way may help to ensure that a user speaks an audio input as naturally as possible (e.g. with no hesitation).

Computing device 10 may include text-to-symbol module 26 which, in addition to the capability described above, may optionally send the one or more substituted symbols to output device 36 in response to receiving an input (e.g., at input devices 34) indicating that substituted symbols be outputted instead of alphanumeric characters.

For example, in a default mode, computing device 10 may display alphanumeric characters during a speech-to-text transcription. User interfaces 16 may include an option displayed at screen 14 that when selected, indicates to computing device 10 to display substituted symbols during speech-to-text transcriptions. Computing device 10 may receive an indication of a user input at input device 34 that corresponds to a selection of the option. Text-to-symbol module 26 may receive the option from input device 34 and based at least in part on the indication of the user input, configure computing device 10 to output substituted symbols instead of alphanumeric characters. In other words, instead of sending alphanumeric characters to output device 36 during a speech-to-text transcription, text-to-symbol module 26 may send substituted symbols to output device 36.

Computing device 10 may rely on speech-to-text module 24 to determine that receipt of the audio input has completed in order to trigger a response by text-to-symbol module 26 to transmit the one or more alphanumeric characters to output device 36 as described above. Speech-to-text module 24 may determine that receipt of the audio input has completed by receiving, an indication of a gesture input detected at a presence-sensitive screen. For example, upon finishing speaking the audio input, input devices 34 may receive an indication of a gesture input received at a location of a presence-sensitive screen (e.g. screen 14 of FIG. 1). Computing device 10 may receive the indication of the gesture input and may transmit data associated with the gesture input to speech-to-text module 24. Speech-to-text module 24 may interpret data associated with the gesture input as signifying that receipt of the audio input has completed. Accordingly, speech-to-text module 24 may trigger a response by text-to-symbol module 26 to output alphanumeric characters in place of substituted symbols.

Speech-to-text module 24 of computing device 10 may determine that receipt of the audio input has completed by determining an amount of time during which speech has not been detected and responsive to determining that the amount of time satisfies a threshold, determine that receipt of the audio input has completed. For example, speech-to-text module 24 may determine a segment of the audio input that indicates a segment of silent audio (e.g., lacking speech audio). Speech-to-text module 24 may determine the segment of silent audio elapses for a period of time. The period of time may exceed a threshold set by speech-to-text module 24 for indicating that receipt of the audio input has completed (e.g., one half to ten seconds). In this way, speech-to-text module 24 may identify when a user (e.g. the user of FIG. 1) stops speaking.

Speech-to-text module 24 of computing device 10 may determine an appropriate time to display alphanumeric characters in place of substituted symbols, other than when receipt of the audio input has completed. For example, speech-to-text module 24 may determine a period of time has elapsed since the computing device began receiving the audio input. In response to determining that the period of time satisfies a threshold, speech-to-text module 24 may output for display (e.g. at screen 14 of FIG. 1), at least a portion of the alphanumeric characters in place of at least a portion of the one or more substituted symbols. For instance, during receipt of an audio input of a lengthy e-mail dictation (e.g., including multiple sentences), computing device 10 may determine that the audio input spans a sufficient duration of time that satisfies a time threshold. Speech-to-text module 24 may outputting at least a portion of the alphanumeric characters associated with a first portion of the e-mail dictation in place of at least a portion of the one or more substituted symbols associated with the first portion of the e-mail, while continuing to receive the remainder of the e-mail dictation, may not cause a user to speak unnaturally.

Speech-to-text module 24 of computing device 10 may recognize letters, numbers, acronyms, abbreviations, and words in the audio input. Speech-to-text module 24 may also recognize the context of the letters, numbers, and words, and may recognize sentences. The type of alphanumeric characters outputted by speech-to-text module 24 from the audio input transcription may include a letter, a number, or a punctuation mark.

Speech-to-text module 24 of computing device 10 may transcribe each of the alphanumeric characters into uppercase letters and lowercase letters. Text-to-symbol module 26 of computing device 10 may determine that the alphanumeric characters comprising the series of words include both uppercase and lowercase alphanumeric characters. Text-to-symbol module 26 may determine that each of the one or more substituted symbols that correspond to an uppercase alphanumeric character is different than each substituted symbol from the one or more substituted symbols that correspond to a lowercase alphanumeric character. For example, text-to-symbol module 26 may receive the one or more alphanumeric characters with uppercase and lowercase indications from speech-to-text module 24. Based on the indications, text-to-symbol module 26 may output one substituted symbol for each uppercase alphanumeric character and a different substituted symbol for each lowercase alphanumeric character.

Figure 6:
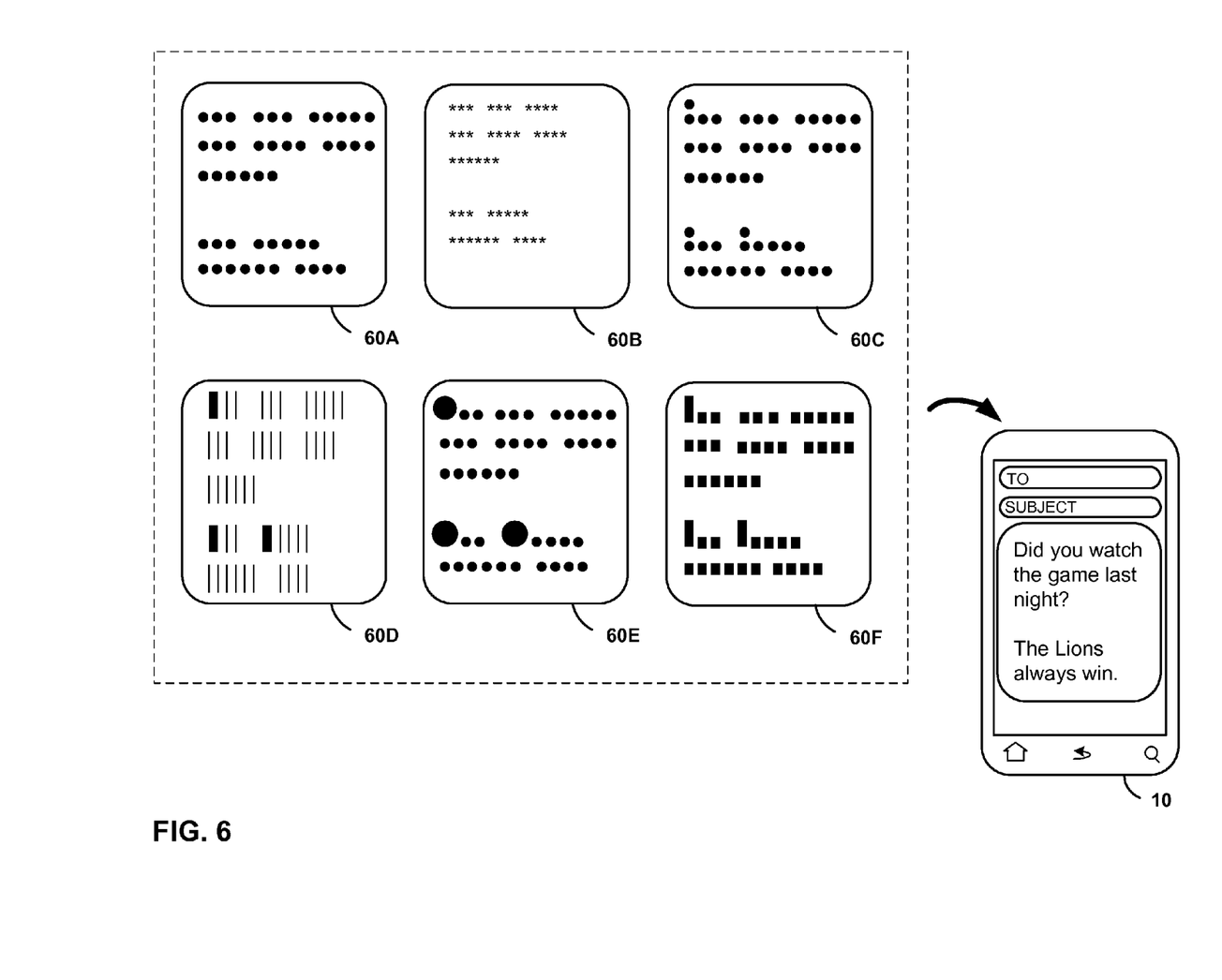
FIG. 6 is a block diagram illustrating multiple examples of user interface that the computing device may output for display.

Text-to-symbol module 26 of computing device 10 may generate different types of substituted symbols from the one or more substituted symbols including a rectangular shape, a circular shape, a star shape, an asterisk, a line segment, and other types of shapes and symbols. FIG. 6, described in detail below, illustrates some different examples of substituted symbols.

Text-to-symbol module 26 of computing device 10 may determine that each substituted symbols from the one or more substituted symbols has a dimension. The dimension may include at least one of a height, a width, and a radius. The dimension of each substituted symbol from the one or more substituted symbols that corresponds to an uppercase alphanumeric character may exceed the dimension of each substituted symbol from the one or more substituted symbols that corresponds to a lowercase alphanumeric character. For example, text-to-symbol module 26 may transmit to output device 36, a substituted symbol for the uppercase letter 'D' and a different substituted symbol for the lowercase letter 'd'. Output device 36 may present at screen 14 the two substituted symbols for the letters 'D' and 'd'. The substituted symbol corresponding to the uppercase letter 'D' may appear to have a taller height than the substituted symbol corresponding to the lowercase letter 'd'.

Text-to-symbol module 26 of computing device 10 may represent each substituted symbol of the one or more substituted symbols that corresponds to an uppercase alphanumeric character as being at least two substituted symbols from the one or more substituted symbols that correspond to a lowercase alphanumeric character. For example, text-to-symbol module 26 may transmit a substituted symbol for the uppercase letter 'D' and a different substituted symbol for the lowercase letter 'd' to output device 36. Output device 36 may present at screen 14 from FIG. 1, the substituted symbols for the letters 'D' and 'd'. The substituted symbol corresponding to the uppercase letter 'D' may appear at screen 14 as two stacked substituted symbols corresponding to the lowercase letter 'd'.

Figure 7:
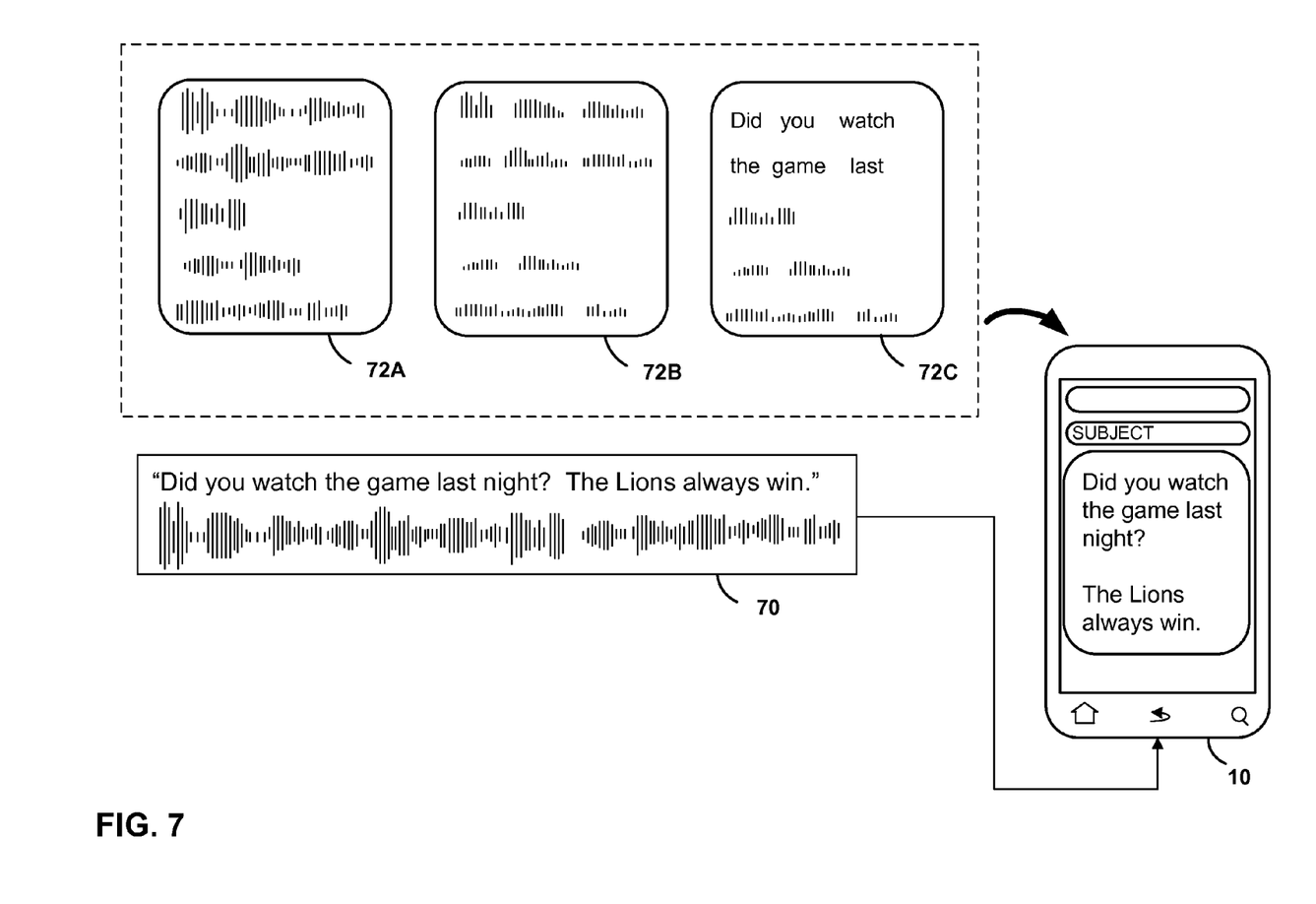
FIG. 7 is a block diagram illustrating additional example user interfaces that the computing device may output for display.

In another example, in addition to determining a series of words based on the audio input, computing device 10 may determine a waveform based at least in part on the audio input. The waveform may have a shape. The shape of the waveform (i.e. the height and width of peaks and valleys of the waveform) may vary based on changes over time to one or more audio parameters associated with the audio input. For example, microphone 12 of computing device 10 may capture an audio input. The audio input may contain a volume level, a tone, a pitch, or other characteristic that varies over time as the user speaks a series of words. Each word from the series of words may correspond to a portion of the wave form. A shape of each substituted symbol from the one or more substituted symbols may reflect the shape of each portion of the waveform that corresponds to each word from the series of words. In other words, a portion of the waveform may correspond to each word spoken by the user and substituted symbols outputted for display by text-to-symbol module 24 at screen 14 during capture of the audio input may depict the shape of each portion of the waveform. FIG. 7, described in more detail below, depicts one example of a computing device displaying substituted symbols having a shape of a waveform of an audio input.

Figure 3:
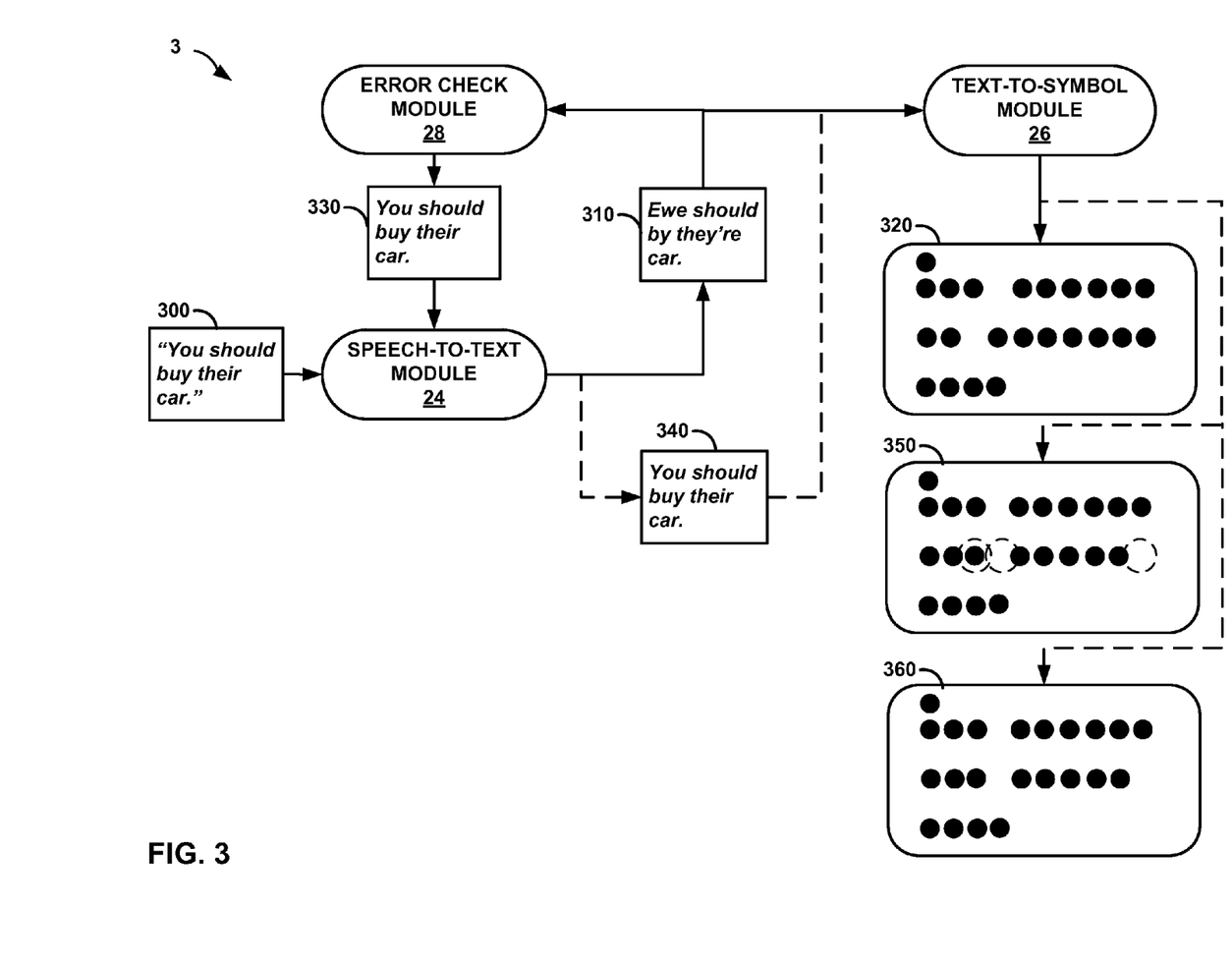
FIG. 3 is a conceptual diagram illustrating an example operation of the computing device.

FIG. 3 is a conceptual diagram illustrating an example operation of the computing device. As discussed in regards to FIG. 2, computing device 10 may include error check module 28. In another example, a remote computing device may perform the functions of error check module 28 much like the example discussed above where speech-to-text module 24 may reside and execute on a remote computing device. Error check module 28 may automatically (i.e., without manual intervention from a user or a machine) perform transcription error checking of a word or an alphanumeric character outputted by text-to-speech module 24. Transcription error checking may include the function of identifying errors made by text-to-speech module 24. Transcription errors may include spelling mistakes, grammatical mistakes, or word choice mistakes (e.g. replacing synonyms based on context and surrounding words previously and subsequently identified by speech-to-text module 24).

As shown in FIG. 3, computing device 10 may determine a first word based on a first segment of audio input 300. In response to determining a first word based on a first segment of audio input 300, error check module 28 of computing device 10 may determine, based on a second segment of audio input 300, a second word to replace the first word. Responsive to determining the second word, error check module 28 may replace at least one substituted symbol that corresponds to the first word with at least one different substituted symbol that corresponds to the second word.

For example, speech-to-text module 24 may output alphanumeric characters 310 based on audio input 300 (e.g. as discussed above under FIG. 2). In this example, audio input 300 received by speech-to-text module 24 represents spoken audio of the words, "You should buy their car." and the alphanumeric characters 310 outputted by speech-to-text module 24 represent the character string "Ewe should by they're car."

In addition to text-to-symbol module 26 receiving the alphanumeric characters 310 outputted by speech-to-text module 24, error check module 28 may receive alphanumeric characters 310. Text-to-symbol module 26 may output for display substituted symbols 320 at a screen (e.g. as discussed above under FIG. 2). Error check module 28 may receive alphanumeric characters 310 and determine that a transcription error occurred with a first word "Ewe". Error check module 28 may replace the first word "Ewe" with a second word "You". Error check module 28 may perform subsequent similar checks on the remaining segments of alphanumeric characters 310, identifying and fixing transcription errors in earlier segments of audio input 300 based on later segments of audio input 300, until error check module 28 outputs alphanumeric characters 330 "You should by their car".

Speech-to-text module 24 may receive alphanumeric characters 330 from error check module 28 and output alphanumeric characters 340 to text-to-symbol module 26. Text-to-symbol module 26 may recognize that alphanumeric characters 340 represent a segment of audio input 300 already being displayed as substituted symbols 320. Text-to-symbol module 26 may replace substituted symbols 320 with substituted symbols 350 and eventually replace substituted symbols 350 with substituted symbols 360.

Using error check module 28, computing device 10 may perform transcription error detection and transcription error correction using a statistical language model. The audio input may include a first segment and a second segment received after the first segment. Computing device 10 may determine one or more words based on the second segment of the audio input. Computing device 10 may determine based at least in part on the one or more words, a probability of a first word based on the first segment of the audio input and a probability of a second word based on the first segment of the audio input. In response to determining that the probability of the second word exceeds the probability of the first word, computing device 10 may output for display, a different group of substituted symbols that correspond to alphanumeric symbols of the second word in place of the one or more substituted symbols that correspond to the alphanumeric symbols of the first word.

The probability of the first word may be based on a language model probability that the first word is positioned in a sequence of words including the series of words and the probability of the second word may be based on a language model probability that the second word is positioned in a sequence of words including the series of words. For instance, error check module 28 may include a language model that uses n-gram language models and a lexicon for determining a probability that a word is positioned in a sequence of words (e.g., a sentence). Or in other words, the language model determines a probability that a word precedes a particular sequence of words, follows the particular sequence of words, or is positioned within the particular sequence of words.

For example, as described above, computing device 10 may output for display substituted symbols 320 that correspond to an initial word from of audio input 300. Based at least in part on one or more words determined from a later segment of audio input 300, error check module 28 may determine, a probability of determining the first word based on the first segment and a probability of determining the second word based on the first segment. In response to error check module 28 determining that the probability of the second word exceeds the probability of the first word, error check module 28 may cause computing device 10 to output for display substituted symbols 350 that correspond to alphanumeric symbols of the second word in place of substituted symbols 320 that correspond to the alphanumeric symbols of the first word.

In addition to displaying substituted symbols and updating the substituted symbols based on transcription errors detected, text-to-symbol module 26 of computing device 10 may vary the color of updated substituted symbols to indicate on screen 14 that computing device 10 corrected a transcription error. In other words, the at least one substituted symbol that corresponds to the first word (e.g., before correction by error check module 28) may comprise a first color, and the at least one different substituted symbol that corresponds to the second word (e.g., after correction by error check module 28) may comprise a second color different from the first color.

For example, computing device 10 may display all original substituted symbols, including the substituted symbols that correspond to a word associated with a transcription error in blue. In the course of correcting transcription errors, computing device 10 may display the substituted symbols that correspond to a word associated with a correction to a transcription error in red.

In continuing the example of FIG. 3, text-to-symbol module 26 may display the substituted symbols 320 in blue. Following an update, text-to-symbol module 26 may display the substituted symbols 360 that represent words corrected by error check module 28 (e.g. "You", "buy", and "their") in red, while continuing to display the other substituted symbols 360 in blue.

Text-to-symbol module 26 may correct the transcription and update the substituted symbols on the screen, while continuing to receive the audio input. In other words, replacing the at least one substituted symbol that correspond to the first word with the at least one different substituted symbol that correspond to the second word may occur while the computing device is receiving the audio input. For example, while computing device 10 continues receiving the audio input, computing device 10 may replace the substituted symbols that correspond to a word associated with a transcription error with the substituted symbols that correspond to a word associated with a transcription correction.

Speech-to-text module 24 may transcribe and error check module 28 may update alphanumeric characters 310 after receiving the beginning of the audio input, without waiting for a user to finish speaking the remainder of the audio input 300. Configuring computing device 10 in this way may ensure a user speaks audio input 300 as naturally as possible (e.g. with no hesitation) and also may ensure a transcription is accurate after displaying alphanumeric characters in place of substituted symbols.

Figure 4:
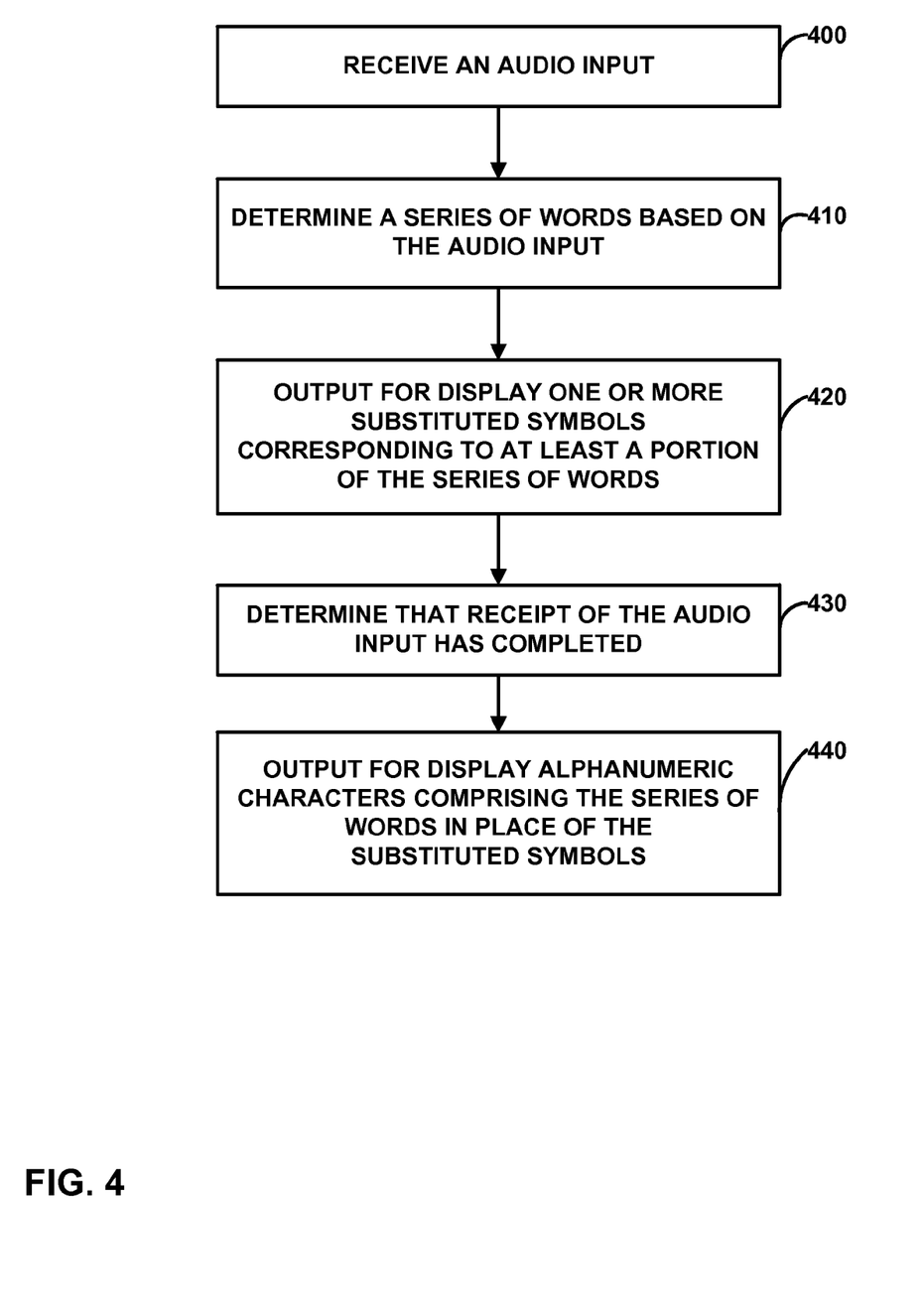
FIG. 4 is a flowchart illustrating an example operation of the computing device.

FIG. 4 is a flowchart illustrating an example operation of a computing device. The steps of FIG. 4 may be performed by one or more processors of a computing device, such as computing device 10 illustrated in FIG. 2. For purposes of illustration, FIG. 4 is described below within the context of computing devices 10 of FIGS. 1, 2, and 3.

Computing device 10 may receive an audio input (400). For example, computing device 10 may receive a dictation of an e-mail from a user at microphone 12. Computing device 10 may determine a series of words based on the audio input (410). For example, speech-to-text module 24 of computing device 10 may output one or more alphanumeric characters based on the audio input where the alphanumeric characters represent the series of words that make up the text of the dictated e-mail. Computing device 10 may output for display one or more substituted symbols corresponding to at least a portion of the series of words (420). For example, to promote natural speech patterns in the audio input (e.g. e-mail dictation), text-to-symbol module 26 of computing device 10 may display one or more substituted symbols instead of the one or more alphanumeric characters determined by speech-to-text module 24. Computing device 10 may determine that receipt of the audio input has completed (430). For example, speech-to-text module 24 may detect a long pause within the audio input (e.g. three seconds of the audio input where speech cannot be detected) and based on the long pause, determine that receipt of the audio input has completed. In response to determining that receipt of the audio input has completed, computing device 10 may output for display alphanumeric characters comprising the series of words in place of the substituted symbols (440). For example, in response to determining that receipt of the audio input (e.g. e-mail dictation) has completed, text-to-symbol module 26 of computing device 10 may display the alphanumeric characters outputted from speech-to-text module 24 (i.e. the transcription of the e-mail dictation) in place of the substituted symbols.

Figure 5:
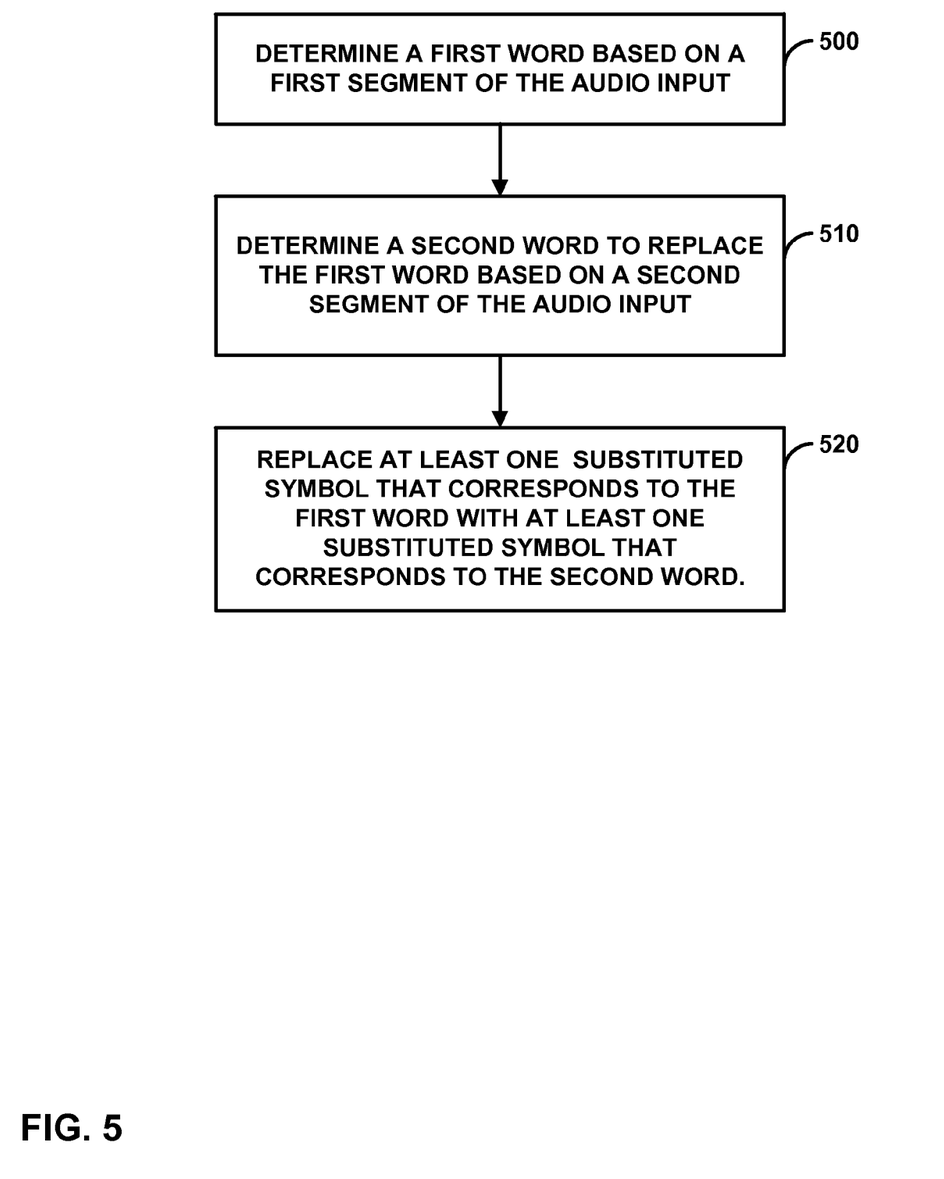
FIG. 5 is a flowchart illustrating an example operation of the computing device with inline transcription error correction.

FIG. 5 is a flowchart illustrating an example operation of the computing device with inline transcription error correction. The steps of FIG. 5 may be performed by one or more processors of a computing device, such as computing device 10 of FIG. 2. For purposes of illustration only, FIG. 5 is described below within the context of computing devices 10 of FIGS. 1, 2, and 3.

As described in regards to FIG. 4, computing device 10 may receive an audio input (e.g. an e-mail dictation), determine one or more alphanumeric characters based on the audio input, and output for display the one or more substituted symbols where each corresponds to a different alphanumeric character. Computing device 10 may determine a first word based on a first segment of the audio input (500). For example, error check module 28 of computing device 10 may receive one or more alphanumeric characters transcribed from an audio input by speech-to-text module 24. Error check module 28 may determine a first word represented by a portion of the one or more alphanumeric characters (e.g. a portion of the audio input).

Computing device 10 may determine a second word to replace the first word based on a second segment of the audio input (510). For example, error check module 28 may identify a transcription error in the first word based on previous and subsequent portions of the one or more alphanumeric characters received from speech-to-text module 24.

Computing device 10 may replace at least one substituted symbol that corresponds to the first word with at least one substituted symbol that corresponds to the second word (520). For example, speech-to-text module 24 may receive a correction to one or more alphanumeric characters from error check module 28. Based on the correction, speech-to-text module 24 may update the one or more alphanumeric characters outputted to text-to-symbol module 26. Text-to-symbol module 26 may detect the update to the one or more characters and may replace the substituted symbols that correspond to transcription error with substituted symbols corresponding to the correction.

FIG. 6 is a block diagram illustrating multiple examples of user interface that the computing device may output for display. In the example of FIG. 6, user interfaces 60A through 60F represent various examples of substituted symbols that computing device 10 may display during a transcription of an audio input received as, "Did you watch the game last night? The Lions always win."

User interface 60A illustrates an example of computing device 10 displaying circles or dots as substituted symbols. User interface 60B illustrates an example of computing device 10 displaying star shapes or asterisks as substituted symbols. User interface 60C illustrates an example of computing device 10 displaying circles or dots as substituted symbols and indicating the substituted symbols that correspond to uppercase alphanumeric characters by displaying two vertically aligned substituted symbols that correspond to lowercase alphanumeric characters.

User interface 60D illustrates an example of computing device 10 displaying rectangles or line segments as substituted symbols and indicating the substituted symbols that correspond to uppercase alphanumeric characters by varying the width of the substituted symbols. User interface 60E illustrates an example of computing device 10 displaying circles or dots as substituted symbols and indicating the substituted symbols that correspond to uppercase alphanumeric characters by varying the radii of the substituted symbols. User interface 60F illustrates an example of computing device 10 displaying rectangles or line segments as substituted symbols and indicating the substituted symbols that correspond to uppercase alphanumeric characters by varying the height of the substituted symbols.

FIG. 7 is a block diagram illustrating additional example user interfaces that computing device 10 may output for display. In the example of FIG. 7, user interfaces 72A through 72C represent various examples of substituted symbols that computing device 10 may output for display during a transcription of an audio input 70 captured by the computing device and transcribed into "Did you watch the game last night? The Lions always win." In the example of FIG. 7, audio input 70, in addition to representing a series of words, represents a waveform that has a shape. The shape may indicate an audio parameter or variable associated with the audio input as the parameter or variable changes over time. User interfaces 72A through 72C depict how computing device 10 presents the portion of the waveform corresponding to each word of the audio input with substituted symbols over time. Similar to computing device 10 presenting substituted symbols to represent each alphanumeric character in the series of words (shown in FIG. 6), computing device 10 may present symbols in the shape of a wave form rather than the actual alphanumeric characters to potentially ensure a user speaks naturally during a dictation.

Figure 8:
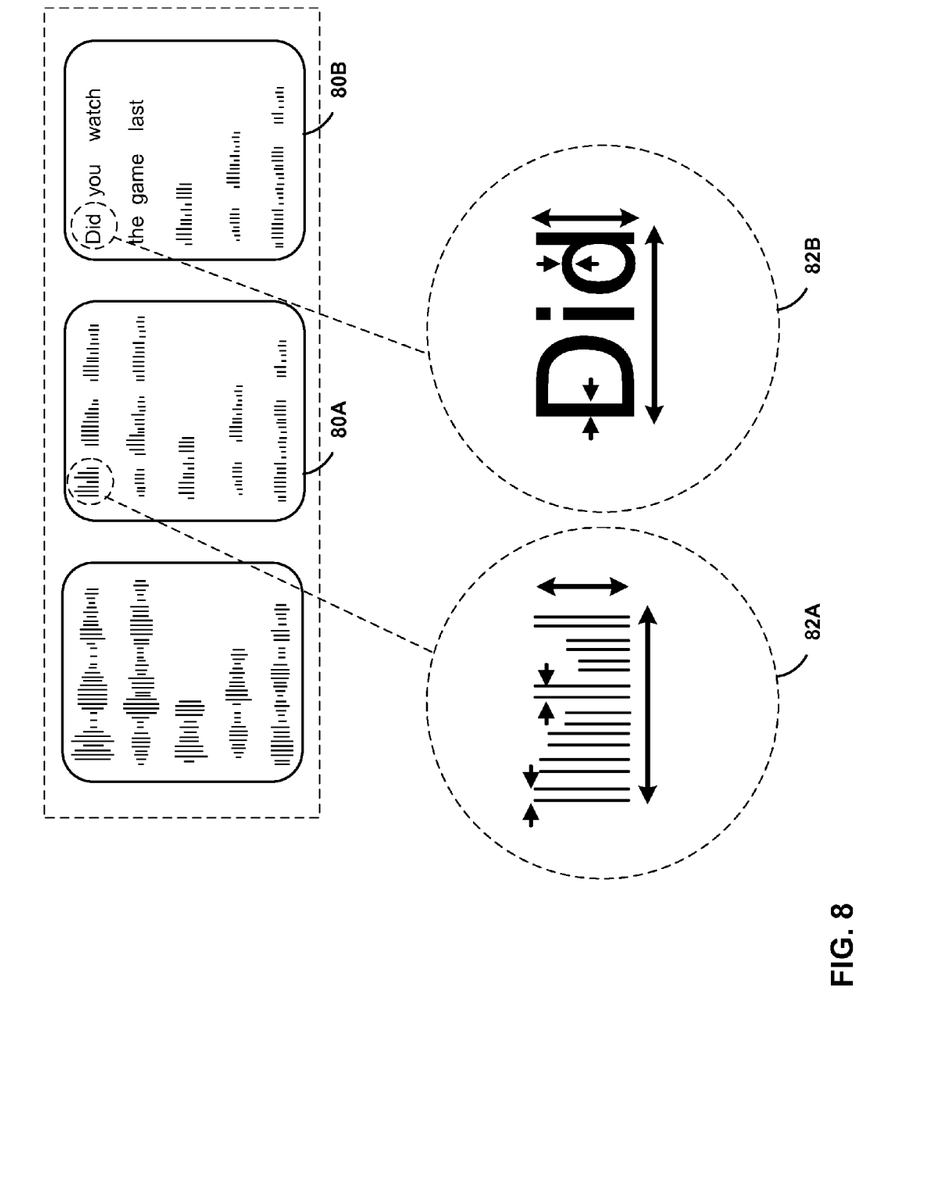
FIG. 8 is a block diagram illustrating additional magnified example user interfaces that the computing device may output for display.

FIG. 8 is a block diagram illustrating additional magnified example user interfaces that computing device 10 may output for display. The examples of FIG. 8 resemble the examples of FIG. 7, except views 82A and 82B show user interfaces 80A and 80B in an expanded view. Views 82A and 82B depict how computing device 10 may transform the shape of the waveform depicted by the substituted symbols displayed after computing device 10 identifies each word in the audio input. The substituted symbols may originally reflect the shape of the waveform represented by the audio input as discussed above. However, as computing device 10 identifies each word in the audio input, computing device 10 may adapt the shape of the waveform depicted by the substituted symbols based on the height and width of the alphanumeric characters that computing device 10 eventually displays on the screen.

Computing device 10 may stretch the shape of each portion of the waveform corresponding to each word so the width of each portion of the waveform depicted by the substituted symbols matches the width of each word when presented on the screen. Likewise, computing device 10 may stretch or shrink the shape of each portion of the waveform corresponding to each word so the height of the waveform depicted by the substituted symbols resembles the height of each word when presented at the screen. In this example, the substituted symbols presented at the screen depict both the shape of the waveform represented by the audio input and the alphanumeric characters of each word.

For example, the substituted symbols in view 82A may correspond to the alphanumeric characters "Did" in view 82B. The substituted symbols in view 82A may depict the shape of the waveform associated with the audio input. Prior to displaying the alphanumeric characters "Did", computing device 10 may stretch or shrink the substituted symbols so the substituted symbols in view 82A span the same width and height on the screen as the alphanumeric characters "Did" shown in view 82B. Stretching and/or shrinking the substituted symbols in this way may provide a transition from depicting a waveform represented by the audio input to displaying the series of words. The transition may ensure the display informs but does not distract the user while computing device 10 transcribes the audio input.

Many other variations of substituted symbols and methods for distinguishing between uppercase and lowercase representations may exist. In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   receiving, at a computing device, an audio input;
   determining, by the computing device, a series of words based on the audio input, the series of words including one or more alphanumeric characters;
   outputting, by the computing device, for display, one or more substituted symbols, wherein the one or more substituted symbols correspond to at least a portion of the series of words, and wherein each of the one or more substituted symbols corresponds to an individual respective alphanumeric character of the one or more alphanumeric characters; and
   responsive to determining that receipt of the audio input has completed, outputting, by the computing device, for display, the one or more alphanumeric characters in place of the one or more substituted symbols.

2. The method of claim 1, wherein outputting the one or more substituted symbols occurs during receipt of the audio input.

3. The method of claim 1, further comprising:
   determining, by the computing device and based at least in part on the audio input, a waveform having a shape, wherein each word from the series of words corresponds to a portion of the waveform, and wherein a shape of each substituted symbol from the one or more substituted symbols reflects the shape of each portion of the waveform that corresponds to each word from the series of words.

4. The method of claim 1, wherein determining the series of words further comprises:
   transmitting, by the computing device, to a remote computing device, the audio input; and
   receiving, by the computing device, from the remote computing device, the series of words based on the audio input.

5. The method of claim 1, further comprising:
   receiving, by the computing device, an indication of a user input; and
   configuring, by the computing device and based at least in part on the indication of the user input, the computing device to output substituted symbols instead of alphanumeric characters.

6. The method of claim 1, wherein determining that receipt of the audio input has completed comprises:
   receiving, by the computing device, an indication of a gesture input detected at a presence-sensitive screen.

7. The method of claim 1, wherein determining that receipt of the audio input has completed comprises:
   determining, by the computing device, an amount of time during which speech has not been detected; and
   responsive to determining that the amount of time satisfies a threshold, determining, by the computing device, that receipt of the audio input has completed.

8. The method of claim 1, further comprising:
   determining, by the computing device, that a period of time has elapsed since the computing device began receiving the audio input; and
   responsive to determining that the period of time satisfies a threshold, outputting, by the computing device, for display, at least a portion of the one or more alphanumeric characters in place of at least a portion of the one or more substituted symbols.

9. The method of claim 1, wherein each substituted symbol from the one or more substituted symbols corresponds to a different alphanumeric character in the series of words.

10. The method of claim 1, wherein each of the one or more alphanumeric characters is either an uppercase or a lowercase alphanumeric character, and wherein each substituted symbol from the one or more substituted symbols that corresponds to an uppercase alphanumeric character is different than each substituted symbol from the one or more substituted symbols that corresponds to a lowercase alphanumeric character.

11. The method of claim 10, wherein each substituted symbol from the one or more substituted symbols has a dimension, the dimension including at least one of a length, a height, a width, and a radius, and wherein the dimension of each substituted symbol from the one or more substituted symbols that corresponds to an uppercase alphanumeric character exceeds the dimension of each substituted symbol from the one or more substituted symbols that corresponds to a lowercase alphanumeric character.

12. The method of claim 10, wherein each substituted symbol from the one or more substituted symbols that corresponds to an uppercase alphanumeric character is represented by at least two substituted symbols from the one or more substituted symbols that correspond to a lowercase alphanumeric character.

13. The method of claim 1, wherein each substituted symbol from the one or more substituted symbols is a rectangular shape, a circular shape, a star shape, an asterisk, or a line segment.

14. The method of claim 1, further comprising:
   responsive to determining a first word based on a first segment of the audio input, determining, by the computing device, based on a second segment of the audio input, a second word to replace the first word; and
   responsive to determining the second word, replacing, by the computing device, at least one substituted symbol that corresponds to the first word with at least one different substituted symbol that corresponds to the second word.

15. The method of claim 14, wherein the at least one substituted symbol that corresponds to the first word comprise a first color and the at least one different substituted symbol that corresponds to the second word comprise a second color different from the first color.

16. The method of claim 14, wherein replacing the at least one substituted symbol that correspond to the first word with the at least one different substituted symbol that correspond to the second word occurs while the computing device is receiving the audio input.

17. The method of claim 1, wherein the audio input comprises a first segment and a second segment received after the first segment, the method further comprising:
   determining, by the computing device and based on the second segment of the audio input, one or more words;
   determining, by the computing device and based at least in part on the one or more words, a probability of a first word based on the first segment of the audio input and a probability of a second word based on the first segment of the audio input; and
   responsive to determining that the probability of the second word exceeds the probability of the first word, outputting, by the computing device, for display, a different group of substituted symbols that correspond to alphanumeric symbols of the second word in place of the one or more substituted symbols that correspond to the one or more alphanumeric symbols of the first word.

18. The method of claim 17, wherein the probability of the first word is based on a language model probability that the first word is positioned in a sequence of words including the series of words, and the probability of the second word is based on a language model probability that the second word is positioned in a sequence of words including the series of words.

19. A computer-readable storage medium comprising instructions that, when executed, cause at least one processor of a computing device to:

receive an audio input;

determine a series of words based on the audio input, the series of words including one or more alphanumeric characters;

output for display, one or more substituted symbols, wherein the one or more substituted symbols correspond to at least a portion of the series of words, and wherein each of the one or more substituted symbols corresponds to an individual respective alphanumeric character of the one or more alphanumeric characters; and responsive to determining that receipt of the audio input has completed, output for display the one or more alphanumeric characters in place of the one or more substituted symbols.

20. A computing device comprising one or more processors, the one or more processors being configured to:

receive an audio input;

determine a series of words based on the audio input, the series of words including one or more alphanumeric characters;

output for display, one or more substituted symbols, wherein the one or more substituted symbols correspond to at least a portion of the series of words, and wherein each of the one or more substituted symbols corresponds to a respective alphanumeric character of the one or more alphanumeric characters; and responsive to determining that receipt of the audio input has completed, output for display the one or more alphanumeric characters in place of the one or more substituted symbols.

* * * * *